United States Patent [19]

Ernst

[11] 3,850,197

[45] Nov. 26, 1974

[54] INSPIRATION/EXPIRATION VALVE

[75] Inventor: Heini Ernst, Witterswil, Switzerland

[73] Assignee: Hoffmann-LaRoche Inc., Nutley, N.J.

[22] Filed: Mar. 15, 1973

[21] Appl. No.: 341,432

[30] Foreign Application Priority Data

Mar. 27, 1972 Switzerland.................... 4512/72

[52] U.S. Cl............ 137/561 R, 128/145.5, 137/604
[51] Int. Cl............................................. F16k 51/00
[58] Field of Search......... 137/561 R, 604; 417/182; 128/145.5–145.8

[56] References Cited
UNITED STATES PATENTS

| 3,181,563 | 5/1965 | Giffen | 137/604 X |
| 3,191,596 | 6/1965 | Bird et al. | 128/145.6 |
| 3,472,258 | 10/1969 | Blosser, Jr. | 137/822 X |
| 3,515,502 | 6/1970 | Coordes | 137/604 X |

*Primary Examiner*—Robert G. Nilson
*Attorney, Agent, or Firm*—Samuel L. Welt; B. S. Leon; Mark L. Hopkins

[57] ABSTRACT

A valve device having virtually no moving parts and particularly useful as an inspiration/expiration valve for respirators comprising a housing in which there is disposed at least two perpendicular channels intersecting in a T-shaped configuration, a flow-immersed oblong body disposed in a first one of the channels and in part at a position opposite to a region of intersection of the second channel with the first channel and where connection points are provided at least at non-intersecting ends of the channels.

7 Claims, 1 Drawing Figure

PATENTED NOV 26 1974 3,850,197
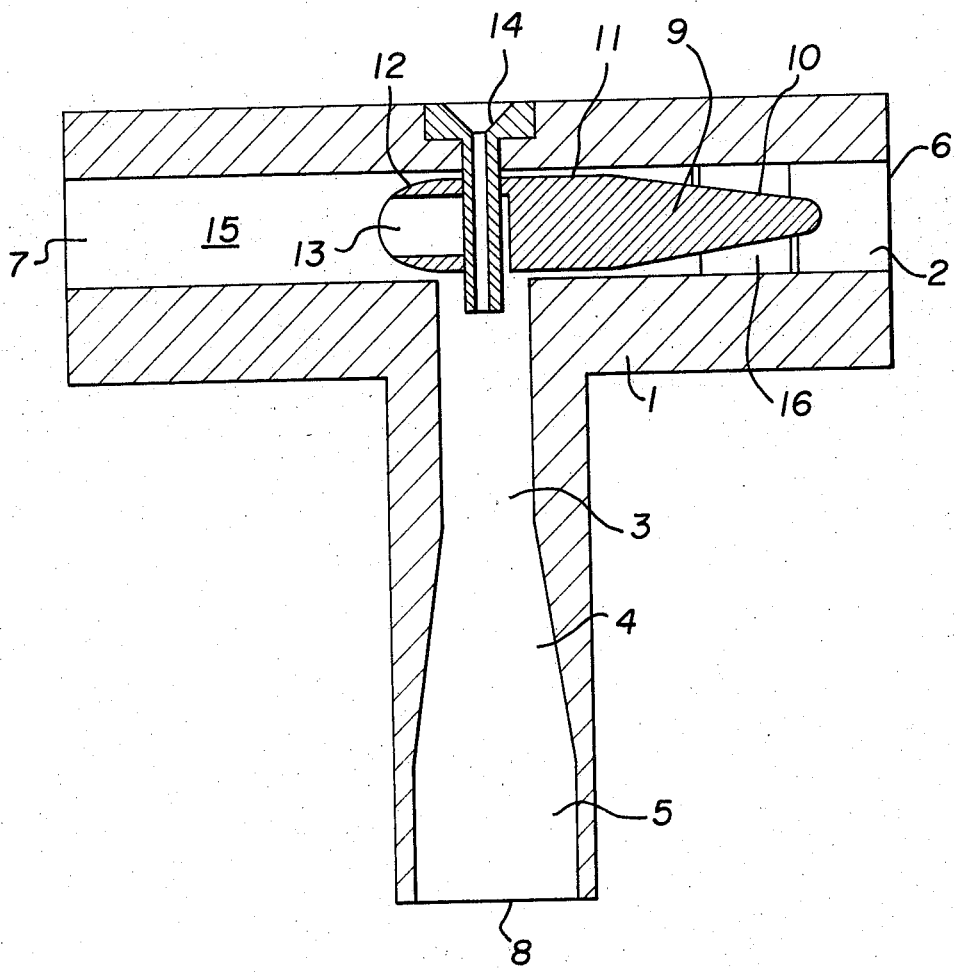

INSPIRATION/EXPIRATION VALVE

BACKGROUND OF THE INVENTION

The present invention relates to the field of devices having a valve function, and more particularly, to an inspiration/expiration valve for use in respirators.

SUMMARY

The invention concerns a device with a valve-function, in which a gas or liquid stream from a first connection, the inlet, is lead to a second connection, while an oppositely directed stream (arriving through this second connection) is led to a third connection, the outlet characterized by a first channel leading from the inlet to the second connection, a second channel (arranged perpendicular thereto) connecting the first channel with the outlet and a flow-immersed oblong body (arranged concentrically to the first channel, in the region of intersection with the second channel) with a central cylindrical part, one conical part at each side of the cylindrical part and a boring leading from the front end conical part of the flow-immersed body facing the second connection to the part of the exterior surface of the flow-immersed body opposite the region of intersection of the second channel with the first channel.

For the purpose of improvement of the function, the device can further have an additional channel arranged concentrically to the axis of the second channel and opening therein. For the purpose of a further improvement, guide vanes can be provided arranged radially in the region of the conical part facing the input, which are twisted with respect to planes intersecting through the axis of the first channel.

BRIEF DESCRIPTION OF THE DRAWING

FIG. 1 shows a vertical cross-section of the valve device according to the invention.

DESCRIPTION OF THE PREFERRED EMBODIMENT

The device shown in the drawing has an essentially T-shaped housing 1. The housing part corresponding to the cross-piece of the T, has a continuous boring 2 with circular cross-section, which forms a first channel. The one end 6 of this boring or of this channel serves as first connection of the device to a line (not shown) and represents an inlet for the device. The opposite or second end 7 of the boring or of the first channel 2 serves as second connection to a further line (not shown). In the housing part corresponding to the vertical member of the T, there runs a second boring or a second channel 3, whose axis intersects the axis of the first boring 2. The boring 3 has firstly a cylindrical region (neighboring the boring 2) with about the same cross-section as the boring 2, opens up conically in an adjacent region 4 and continues again cylindrically with increased cross-section in a further region 5 which terminates at the end 8 representing an outlet for the device, and which may serve as a connection to a line (not shown).

In the first channel 2 there is placed, co-axially thereto and in the region of the outlet of the second channel 3 therein, an elongated, approximately drop-shaped or bullet-shaped body 9, which is denoted in the following as a flow-immersed body. With respect to its cross-section the a flow-immersed body has essentially 3 regions. In the first region 10 facing the inlet 6 of the device, the body 9 has a conical shape with a spherically rounded end surface, in the central region 11 a cylindrical form, and in the adjacent region 12 facing the connection 7 again a conical form with spherical rounding at the end. The area of the transition between cylindrical region 11 and second conical region 12, is disposed in a plane which lies in the axis of the second channel 3 and is perpendicular to the axis of the first channel 2. From the spherically rounded front end 12 of the a flow-immersed body 9 facing the second connection 7, a boring 13 runs first co-axially to the channel 2 and then, bent at 90°, co-axially to the channel 3 up to the part of the outer or exterior surface of the a flow-immersed body 9 opposite to the area whereat the channel 3 intersects channel 2.

A thin tube 14 is installed in borings co-axial with respect to the second channel 3, through the wall of the housing 1 (opposite the intersection of the second channel 3 with the first channel 2) and through the flow-immersed body. The tube 14 opens into the narrow upper cylindrical region of the channel 3.

In the region of the first conical part 10 facing the inlet 6, flow-immersed body 9 has a number of radially arranged vanes or guide vanes 16, which are inclined with respect to planes cutting them through the axis of the device at a small angle, for example 6°. The vanes 16 serve on the one hand for the fixing and centering of the flow-immersed body 9 and on the other hand, by their inclination thereto, for imparting a swirling to the medium flowing through the tube.

The space 15 (between the end 12 of the flow-immersed body 9 and the second connection 7) and the widened-out part 4, 5 of the channel 3, served as a diffusor.

The inlets and outlets (or connections) of the device serve for the connection with suitable lines for which the device was designed. How such connections are provided for, is obvious to the person skilled in the art and does not have to be described further here. Various types of suitable connections, such as screw-connections, plug-connections, flanged-connections, etc., may be considered.

The device can be manufactured from various materials. In particular, the device is suitable for manufacture from plastic. This is of significance for the employment in respirators, since the manufacture from plastic is so inexpensive that the device can be discarded after a single use and therewith the purification and sterilization expenditure is eliminated.

Although the device can obviously be used for very different purposes, its function is described as follows by way of employment as an inspiration/expiration valve (hereinafter I/E valve) in a respirator. In this case the inlet 6 and the tube 14 are connected to two outputs of a control valve (not shown). The control valve serves to direct the respiration gas alternately to the input 6 and to the tube 14, with an average pressure of about 1.2 atm. As will be seen from the following, the time during which the respiration gas flows through the inlet 6 corresponds to the inspiration phase and the time during which the gas flows through the tube 14 corresponds to the expiration phase. The connection 7 is connected, optionally via a mesuring-head, directly to the patient-line or to the tracheal tube. Finally the outlet 8 can either simply be open or, for the purpose of recovery of the expiration gas, can have a connection to the respiration gas source. It is necessary however, that the outlet 8 lies continuously at atmospheric pressure.

In the inspiration phase the respiration gas arrives from the control valve with an average pressure of about 1.2 atm. at the inlet of the device 6. By the reduction of the tube cross-section in the conical region 10 of the flow-immersed body 9, the flow-rate of the gas increases considerably, that is its pressure energy is converted into kinetic energy. In the region of the outlet of the channel 3, the gas has atmospheric pressure. There does not exist therefore, a pressure gradient between this region and the channel 3, and consequently, practically no respiration gas flows through the channel 3 during this phase.

The cylindrical region 11 of the flow-immersed body was selected relatively long so that a laminar flow can develop. In the diffusion region 15 the pressure energy is recovered from the kinetic energy of the gas and a pressure of ca. 1.1 atm. is attained at the second connection 7 of the I/E valve.

In the expiration phase the expired gas proceeds into the region of the diffusor 15 and through the boring 13 into the channel 3. Since the free cross-section remaining between the cylindrical region 11 of the flow-immersed body and the wall of the first channel 2 is smalller than the cross-section of the boring 13, practically no expired gas proceeds past the circumfluous body 9 to the inlet side of the I/E valve.

The I/E valve could accordingly also fulfill the desired function in principle without the vanes or guide vanes 16 and the tube 14. The vanes 16 and the tube 14 connected to the second output of a control valve serve for the further improvement of the operation. Specifically, by means of the vanes 16 a swirling is conveyed to the stream, so that a smooth separation of flow is given at the end of the flow-immersed body and a separation of flow from the wall of the first channel 2 is avoided.

If, during the expiration phase, a gas stream is led through the tube 14, the action of an aspirator is given, by which the expiration gas is sucked out of the diffusor region 15 through the boring 13. This suction effect serves primarily for the assistance of the expiration and further helps to avoid during the expiration phase, even with increased pressure in the diffusor region 15, the passing of expired gas past the flow-immersed body in the direction of the inlet 6. The diffusor region 4, 5 serves again for the conversion of the kinetic energy into pressure energy, so that the gas can discharge from the outlet 8 at atmospheric pressure.

When used as an I/E valve in respirators, the advantages of the device in accordance with the invention are obvious. The expiration gas usually has a high content of liquid drops and a known constitutent of solid materials. Thereby usual valves with moving parts frequently deteriorate very quickly in their function and have to be cleaned or replaced. With the present I/E valve practically no obstruction of the channels can occur since in each case they are blown free in the succeeding inspiration or expiration phase. Further, as already emphasized, the present I/E valve is suitable for manufacture as an inexpensive throw-away part, whereby repeated cleaning and sterilization can be obviated.

I claim:

1. A device having use as a valve, via which a gas or liquid stream may be led from a first connection to a second connection while an oppositely directed stream arriving by way of this second connection is led to a third connection, comprising:

a first channel extending between said first and second connections;

a second channel intersecting via one of the ends thereof said first channel and with the other end thereof defining said third connection; and an oblong flow-immersed body longitudinally disposed in said first channel in the region of intersection with said second channel, said body having an angled boring leading from the end portion of the body facing said second connection to the side surface of the body at a portion thereof facing the region of intersection of said first and second channels, said flow-immersed body having a cross-section which widens from the two ends of said body towards the central portion thereof such that proximate said central portion said first channel is restricted by said body to a narrow passage for gas or liquid flow.

2. A device according to claim 1 wherein said channels and said flow-immersed body have circular cross-sections and wherein said body is disposed concentrically inside said first channel.

3. A device according to claim 2 further including guide vane means provided on the conical part of said body facing said first connection, said guide vane means being radially arranged on said body with predetermined slight displacement with respect to planes intersecting through an axis defined by said first channel.

4. A device according to claim 2 wherein said central portion is cylindrically shaped and extends toward said first connection from a plane perpendicular to the axis defined by said first channel, set through the axis defined by said second channel.

5. A device according to claim 2 wherein said boring is angled at 90° to thereby run concentrically to each of the axes defined by said first and second channels.

6. A device according to claim 2 wherein said second channel includes a channel cross-section broadening toward said third connection to serve as a diffuser.

7. A device according to claim 1 further including a tubular member extending coaxially with said second channel through said first channel and said flow-immersed body into the intersecting end of said second channel.

* * * * *